March 30, 1954   J. H. COOMBES ET AL   2,673,622
BRAKE ARRANGEMENT ON SPRUNG-FRAME RAILWAY TRUCK
Filed Sept. 1, 1950
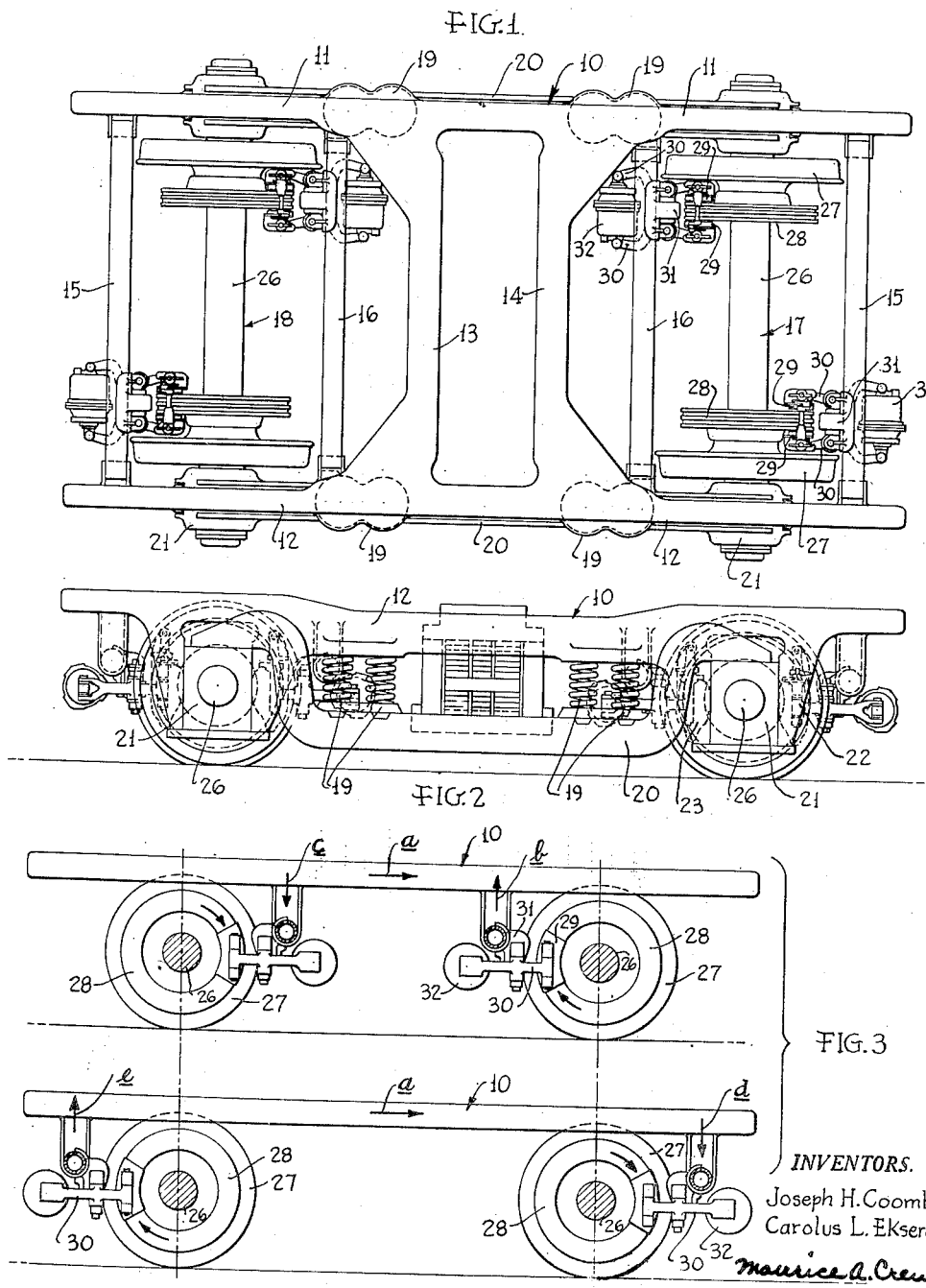
INVENTORS.
Joseph H. Coombes
Carolus L. Eksergian
Maurice A. Crews
ATTORNEY

Patented Mar. 30, 1954

2,673,622

UNITED STATES PATENT OFFICE 2,673,622

BRAKE ARRANGEMENT ON SPRUNG-FRAME RAILWAY TRUCK

Joseph H. Coombes, Jenkintown, and Carolus L. Eksergian, Media, Pa., assignors to The Budd Company, Philadelphia, Pa., a corporation of Pennsylvania Application September 1, 1950, Serial No. 182,864

1 Claim. (Cl. 188—59)

The invention relates to brake mechanisms and particularly to such mechanisms as are applied to a sprung-frame railway truck.

In the usual passenger railway truck the frame is spring-mounted through springs disposed at the opposite sides of the frame and on opposite sides of the transverse vertical plane of the truck through the intermediary of equalizers having their ends seated on the journal boxes at the ends of a pair of wheel and axle assemblies. The frame is guided for vertical springing movement thereof by the engagement of the journal boxes at the ends of the wheel and axle assemblies with the usual pedestal guides associated with the frame.

Such trucks are usually provided with four brake mechanisms, one associated with each of the four wheels carried by the two wheel and axle assemblies. One such brake mechanism that has proved highly successful consists of a rotor in the form of a disc having opposed radial braking faces associated with each of the four wheels, and stationary brake mechanism consisting of a pair of segmental shoes in cooperative relation with the respective braking faces of the disc and having support from the truck frame inwardly of the axle. With this arrangement, when the truck is moving in one direction when the brakes are applied, the brakes associated with the forward axle supply a torque to the frame tending to raise the forward end of the frame while the brakes associated with the rearward axle tend to depress the rearward end of the frame. Thus the brakes have a tendency to cause pitching of the truck frame about a horizontal transverse axis, which results in unpleasant riding qualities.

The present invention has to do with the arrangement of the brake mechanisms of this class on the truck so as to minimize or completely avoid such pitching of the truck frame, and also any lateral rolling tendency of the truck frame is avoided.

This object and others and the manner in which they are attained will become evident from the following description when read in connection with the accompanying drawing forming a part of this specification.

In the drawing:

Figure 1 is a plan view of a railway truck to which the invention has been shown applied;

Figure 2 is a side elevation of the truck; and

Figure 3 is a diagrammatic showing of the manner in which the torque forces are applied to the truck frame, the upper portion of the view corresponding to the arrangement shown at the top of Figure 1 and the lower portion of the view corresponding to the arrangement shown at the bottom of Figure 1.

The truck to which the invention is shown applied comprises a rigid frame 10 having longitudinal side members 11 and 12 interconnected centrally by the spaced transoms 13 and 14, and adjacent the ends by spaced pairs of transoms 15 and 16. Longitudinally between each end pair of transoms 15 and 16 are arranged the wheel and axle assemblies 17 and 18 which support the truck frame, the frame being sprung through the spring nests, as 19, distributed as clearly shown in Figure 1, which spring nests are interposed between the side frame members 11 and 12 and equalizers, as 20, having their ends resting upon the journal boxes 21 at the ends of the wheel and axle assemblies 17 and 19. The frame is guided for vertical movement by the engagement between the journal boxes 21 and the associated pedestal jaws 22 and 23 on the frame 10.

Adjacent each end of the wheel and axle assemblies 17 and 18, each of which includes an axle 26 rotatable in the journal boxes associated with its ends, is rigidly mounted, on the associated axle, the pair of wheels 27, 27.

The brakes associated with each wheel comprise a rotor disc 28 having radial braking faces and a pair of shoes 29, 29 for engagement with the opposite faces of the rotor. The shoes are pivotally supported by a pair of brake levers 30, 30 which are pivotally supported by a brake support, as 31, secured to an adjacent transom 16 or 15 of the truck frame. The shoes associated with a disc are actuated by a cylinder actuator 32 interposed between the ends of the levers remote from the shoes. To allow the shoes to follow the movements of the associated disc, the brake support is preferably pivoted on a longitudinally extending axis, as shown in the copending application Serial No. 179,738, filed August 16, 1950, and assigned to a common assignee, now Patent No. 2,622,704, issued December 23, 1952.

To obtain the balanced application of torque forces to the truck frame so as to minimize pitching and rolling, the brake mechanisms mounted on the truck frame at one side of the truck, as shown at the top of Figure 1 and in the upper view of Figure 3, are disposed inwardly of the respective axles toward the central transverse vertical plane of the truck. In other words, they are carried as shown by the transoms 16.

The brake mechanisms mounted on the truck frame at the other side, as shown at the bottom of Figure 1 and in the lower view of Figure 3, are disposed outwardly of the respective axles away from the central transverse vertical plane of the truck; i. e., they are carried by the end transoms 15.

With this arrangement the application of the torque forces to the frame will take place as is made clear by the diagrammatic showing of Figure 3.

Assuming the truck is moving in the direction of the arrows $a$, the forward brake mechanism at the top of Figure 3 is seen to tend to raise the frame 10 as shown by the arrow $b$, while the rearward brake mechanism, also as seen at the top of Figure 3, is seen to tend to depress the frame as shown by the arrow $c$. This would tend to cause the frame to pitch, but such pitching is avoided by the arrangement of the brake mechanisms at the other side of the truck, as indicated at the bottom of Figure 3. Here the forward brake mechanism is seen to tend to depress the forward end of the frame, as indicated by the arrow $d$, and the rearward brake mechanism is seen to tend to raise the rear end of the frame as indicated by the arrow $e$.

Thus the torque forces represented by the arrows $b$ and $d$ and $c$ and $e$ at the opposite ends of the truck tend to balance each other through the relative rigidity of the frame and thus tend to avoid pitching of the frame. Similarly, the torque forces $b$ and $d$ at the opposite sides of the front of the truck frame are opposed by the forces $c$ and $e$ at the opposite sides of the rear of the truck and thus tend, through the relative rigidity of the truck frame, to avoid lateral roll of the truck frame.

Not only are the vertical forces balanced in the rigid frame to avoid rolling and minimize pitching but the arrangement imposes the minimum twist on the frame and axles in obtaining this effect. A braking effect is obtained at each end of each axle, hence the twist on the axles is zero except as wheels may slip on the track. Also since the vertical forces on each side act about a transverse axis at the mid-length of the truck frame, and in opposite directions on opposite sides, and since the vertical forces at each end act about a longitudinal axis at the mid-width of the frame, and in opposite directions at opposite ends of the frame, the twist on the frame will be a minimum within the limits of the desired effects with a minimum of equipment.

While a specific embodiment of the invention has been described herein in detail, it will be understood that changes and modifications may be made by those skilled in the art without departing from the spirit and scope of the invention as expressed in the appended claim.

What is claimed is:

A basic brake arrangement for a four-wheel truck assembly having a wheel and axle unit at each end thereof and a rigid spring-supported frame carried on the wheel and axle units and extending longitudinally beyond both axles, comprising in combination, a brake rotor disc on each wheel and axle unit near each end, and a single brake unit for each disc, each brake unit being mounted wholly upon the spring-mounted frame and taking the braking reaction wholly into the frame, each brake unit including brake shoes engaging a disc at one side of the axle axis and near the axis height to produce an upward or downward reaction on the spring-mounted frame when the brakes are applied, the brake units at one side of the frame being disposed longitudinally between the axle axes, and the brake units for the other side of the frame being disposed longitudinally outside the axle axes, whereby when the brakes are applied there is produced a coupled upward and downward reaction on each side and at each end of the frame, the coupled reactions at each side acting about a transverse axis at the mid-length of the frame, and the coupled reactions at each end acting about a longitudinal axis at the mid-width of the frame to avoid rolling and to minimize pitching of the truck frame when the brakes are applied and to minimize strains in the axles and truck frame.

JOSEPH H. COOMBES.
CAROLUS L. EKSERGIAN.

References Cited in the file of this patent

UNITED STATES PATENTS

| Number | Name | Date |
| --- | --- | --- |
| 622,697 | Lewis | Apr. 11, 1899 |
| 722,930 | Wadey | Mar. 17, 1903 |
| 2,286,517 | Tack | June 16, 1942 |
| 2,416,869 | Eksergian | Mar. 4, 1947 |
| 2,423,694 | Eksergian et al. | July 8, 1947 |
| 2,465,823 | Tack | Mar. 29, 1949 |
| 2,488,845 | Baselt | Nov. 22, 1949 |